(12) United States Patent
Bikumala et al.

(10) Patent No.: US 10,938,792 B2
(45) Date of Patent: Mar. 2, 2021

(54) LAYERED ENCRYPTION FOR END TO END COMMUNICATION

(71) Applicant: Dell Products L. P., Round Rock, TX (US)

(72) Inventors: Sathish Kumar Bikumala, Round Rock, TX (US); Charles D. Robison, Buford, GA (US)

(73) Assignee: Dell Products L.P., Round Rock, TX (US)

( * ) Notice: Subject to any disclaimer, the term of this patent is extended or adjusted under 35 U.S.C. 154(b) by 253 days.

(21) Appl. No.: 15/884,538

(22) Filed: Jan. 31, 2018

(65) Prior Publication Data

US 2019/0238519 A1 Aug. 1, 2019

(51) Int. Cl.
*H04L 29/06* (2006.01)
*H04L 9/08* (2006.01)
*H04L 9/32* (2006.01)
*G06F 21/60* (2013.01)

(52) U.S. Cl.
CPC ........ *H04L 63/0442* (2013.01); *H04L 9/0869* (2013.01); *H04L 9/3278* (2013.01); *H04L 63/0823* (2013.01); *G06F 21/602* (2013.01)

(58) Field of Classification Search
CPC ............. H04L 63/0442; H04L 63/0823; H04L 9/3278; H04L 9/0869; H04L 21/602; H04L 21/606
See application file for complete search history.

(56) References Cited

U.S. PATENT DOCUMENTS

| | | | | |
|---|---|---|---|---|
| 7,835,521 B1* | 11/2010 | Pinheiro | ............... | G06F 3/0219 |
| | | | | 380/239 |
| 9,479,340 B1* | 10/2016 | Miller | ...................... | G09C 1/00 |
| 10,476,663 B1* | 11/2019 | Lazier | ................... | H04L 9/0618 |
| 2017/0048070 A1* | 2/2017 | Gulati | ..................... | G06F 21/57 |
| 2018/0212772 A1* | 7/2018 | Leavy | .................... | H04L 9/085 |

* cited by examiner

*Primary Examiner* — Kevin Bechtel
*Assistant Examiner* — Hamid Talaminaei
(74) *Attorney, Agent, or Firm* — Campbell Stephenson LLP

(57) ABSTRACT

Disclosed herein are methods, systems, and processes to provide layered encryption to facilitate end to end communication. A user input is displayed in a user interface of an input device. A public/private key pair is determined based on a random number, a provisioned seed, or a physical unclonable function (PUF) provided by the input device. A previous public/private key pair is stored in a storage device associated with the input device using a recipient public key as an index. The user input is encrypted with the recipient pubic key. The derived public key is sent as a header followed by the encrypted user input to a host computing device.

18 Claims, 10 Drawing Sheets

US 10,938,792 B2

LAYERED ENCRYPTION FOR END TO END COMMUNICATION

FIELD OF THE DISCLOSURE

This disclosure is related to data encryption. In particular, this disclosure is related to providing layered encryption to facilitate end to end communication.

DESCRIPTION OF THE RELATED ART

Public key cryptography (also called asymmetrical cryptography), is a cryptographic system that uses pairs of keys: public keys which may be distributed and private keys which are known only to the owner Implementing public/private key pairs for cryptography provides authentication (where the public key verifies that a holder of the paired private key sent a message) and encryption (where only the paired private key holder can decrypt the message encrypted with the public key).

End-to-end encryption (E2EE) is a system of communication where only communicating users can read messages. In principle, E2EE prevents potential eavesdroppers (including telecom providers, Internet providers, providers of communication services, and the like) from being able to access the cryptographic keys needed to decrypt the messages. E2EE systems are designed to defeat attempts at surveillance or tampering by preventing third parties from deciphering data being communicated or stored.

Popular messaging applications such as WhatsApp® and Telegram® implement E2EE to secure communications between users. Messages sent using such application services are typically secured with a lock at the source (e.g., on a smartphone) and only the users privy to the communication possess the key needed to unlock and read the messages. In this manner, messages shared between two or more users are encrypted at the source (e.g., by the sender) and at the target (e.g., by the receiver). Unfortunately, gaining direct access to user devices (e.g., smartphones, laptops, desktops, and the like) defeats the purpose of E2EE because sensitive messages can be intercepted and stolen before encryption is applied.

SUMMARY OF THE DISCLOSURE

Disclosed herein are methods, systems, and processes to provide layered encryption to facilitate end to end communication. One such method involves displaying a user input in a user interface of an input device, determining a public/private key pair based on a random number, a provisioned seed, or a physical unclonable function (PUF) provided by the input device, storing a previous public/private key pair in a storage device associated with the input device using a recipient public key as an index, encrypting the user input with the recipient public key, and sending the derived public key as a header followed by the encrypted user input to a host computing device.

In certain embodiments, the encrypted user input is a message, a message manager executing on the host computing device encrypts the encrypted user input, the twice-encrypted user input is received by another host computing device that decrypts the encryption performed by the message manager and sends the encrypted user input to another input device, and the another input device stores the header of the derived public key for encrypting a next message, decrypts the encrypted user input using a private key, and displays the user input in another user interface of the another input device.

In some embodiments, the method involves determining a new public/private key pair after each message is sent from the input device to the host computing device and generating a high entropy asymmetric key pair for each message. In this example, the input device is a keyboard system on a chip (SOC), the keyboard SOC includes a keypad to receive the user input, the storage device is part of the keyboard SOC, the user interface is non-graphical user interface, and the keyboard SOC is communicatively coupled to the host computing device through Universal Serial Bus (USB).

In other embodiments, the method involves generating public/private key pairs based on physical characteristics of the keyboard SOC indicated by the PUF, storing previous public/private key pairs in the storage device, determining whether messages are not synchronized based on the previous public/private key pairs, receiving a recipient address from the host computing device, and indexing the recipient address in the storage device to enable multi-user concurrent messaging.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
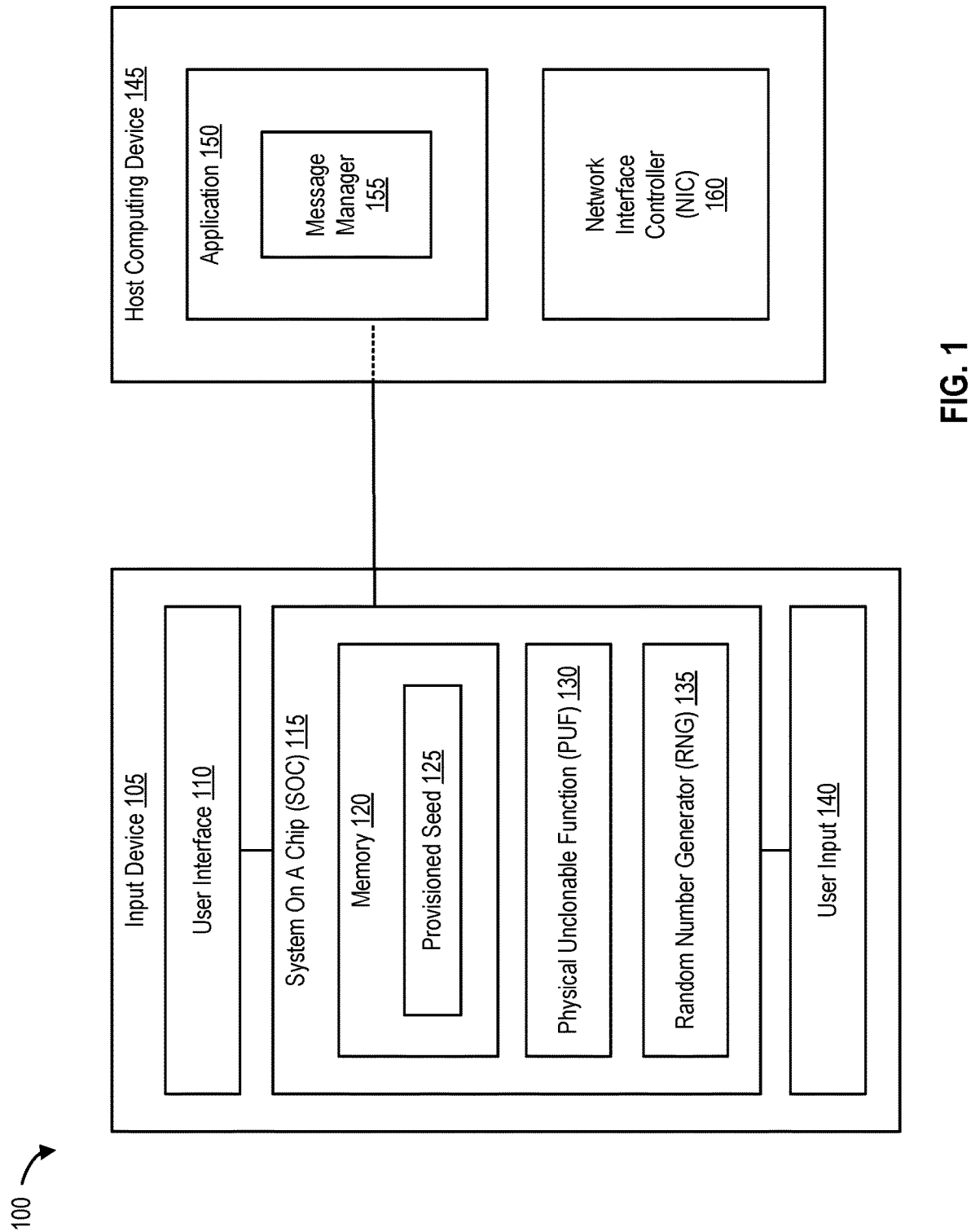
FIG. 1 is a block diagram 100 of a layered encryption computing system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

End-to-end encryption (E2EE) involves encrypting data at rest and maintaining the data encrypted in transit until the data reaches its final destination, where decryption occurs. If implemented correctly using well known and trusted cryptographic methodologies, E2EE can ensure a significant level of data confidentiality. For example, credit card data can be encrypted at a point of sale (POS) terminal using an encryption specification (e.g., Advanced Encryption Standard (AES), Triple Data Encryption Algorithm (3DES), and the like), and is not decrypted until the credit card data reaches a recipient bank for processing.

Another method of protecting data is called tokenization. Tokenization involves substituting a sensitive data element with a non-sensitive equivalent (referred to as a token) that has no extrinsic of exploitable meaning or value. However, tokenization produces computing overhead because a tokenization system needs to be secured and validated using security best practices applicable to sensitive data protection, secure storage, audit, authentication, and authorization. Therefore, tokenization is not a preferred approach for message encryption for high volume communication purposes.

As previously noted, popular messaging services implement E2EE where messages shared between two or more users are encrypted (and decrypted) at the source (e.g., by the sender) and at the target (e.g., by the receiver). Unfortunately, unauthorized access to a user's computing device (e.g., a smartphone, a laptop, a desktop, and the like) defeats the purpose and efficacy of E2EE because sensitive message data can be intercepted and compromised before encryption is applied. Because encryption in E2EE computing environments is performed locally, gaining direct and unauthorized access to a computing device that performs such encryption can permit one or more illicit users and/or parties (e.g., hackers, unsanctioned governmental entities, and the like) to access and read sensitive message data before encryption is even applied (e.g., data can be intercepted when the user types the data into a keyboard and before the data reaches the messaging application for encryption). Because E2EE can be bypassed, an optimized approach to secure end-to-end communication(s) is desirable.

For example, when one or more keys are pressed and/or typed on a traditional keyboard, a smartphone keypad, or other type of input device, keystrokes first arrive at a hardware controller on the computing device's motherboard, the hardware controller forwards the keystrokes to the operating system (OS) kernel's keyboard input stack, the keystrokes are processed by the OS's input manager, the input manager sends the keystrokes to a queue associated with an application window with a current input focus, the application retrieves the keystrokes from the queue and intercepts the keystrokes according to its own context, and the user sees the result of the keystrokes that are pressed. Finally, upon submission (e.g., to a messaging application), the keystrokes are encrypted (e.g., by the messaging application). Unfortunately, and as noted, unauthorized users, parties, and/or entities with direct access to the user's computing device can use key loggers to hack into the above-mentioned touchpoints, record message data, and exploit sensitive information.

Therefore, E2EE implemented for such messaging applications (in addition to other application-based scenarios) faces at least the following security-related challenges. First, a given application's build-in encryption mechanisms can only encode data after the data (e.g., text) travels through various exploitable touch points (e.g., a keyboard driver, an input/output (I/O) processor, and the like). Second, data typed into either a soft keyboard (e.g., a haptic keyboard) or a hard keyboard (e.g., a physical keyboard) can be intercepted before the data reaches the application that is supposed to apply encryption. Third, native application built-in encryption mechanisms are not available during a pre-boot environment, thus preventing encryption. Fourth, typical touch screen mobile devices (e.g., smartphones) lack physical keyboards and typing in text via a soft keyboard requires an active OS mode, making such mobile devices more vulnerable to attacks than in pre-boot mode.

Described herein are methods, systems, and processes to provide layered encryption to facilitate end-to-end communication by preventing unauthorized third parties from intercepting messages intended to be encrypted by messaging applications, securing data content before a native application applies encryption, and/or supporting encryption in both pre-boot and post-boot computing environments.

Example Layered Encryption Computing System

FIG. 1 is a block diagram 100 of layered encryption computing system, according to one embodiment. Such a layered encryption computing system includes an input device 105. Input device 105 generally represents any type or form of input device capable of providing input, either computer or human generated to a host computing device 145. In one embodiment, input device 105 is a keyboard (e.g., a soft keyboard such as a haptic keyboard or haptic input interface for a touch screen computing device (e.g., a smartphone) or a hard keyboard such as a traditional physical keyboard (e.g., an external keyboard for a desktop computing device or a build-in keyboard for a laptop).

Input device 105 includes at least a user interface 110, a System On A Chip (SOC) 115, and a user input 140. In this example, user interface 110 is a non-graphical user interface (non-GUI). However, in other examples, and depending on the processing power and memory capacity of SOC 115, user interface 110 can be a GUI. In one embodiment, user interface 110 is a Liquid Crystal Display (LCD). User input 140 receives user input (e.g., keystrokes) typed via a haptic touch screen keyboard/keypad or a physical keyboard/keypad, and displays the user input on user interface 110.

SOC 115 is an integrated circuit that integrates one or more components of a computer system. SOC 115 can include digital, analog, mixed-signal, and radio-frequency (RF) functions on a substrate. SOC 115 integrates at least a microcontroller or a microprocessor and a memory 120. As shown in FIG. 1, memory 120 includes a provisioned seed 125. In addition to memory 120, SOC 115 further includes a physical unclonable function (PUF) 130 (also called a physically unclonable function), and a random number generator (RNG) 135.

Input device 105 is communicatively coupled to host computing device 145 (e.g., via Universal Serial Bus (USB), among other means). Host computing device 145 can be any type of computing device including a mobile device, a desktop, a laptop, a server, a tablet, and the like. Host computing device 145 includes at least an application 160 that executes a message manager 155 and a network interface controller (NIC) 160.

In one embodiment, application 160 is a messaging application that performs end-to-end encryption (E2EE) and facilitates data communication between two or more users. Message manager 155 encrypts and decrypts messages sent and received by a user of input device 105, respectively, and NIC 160 transmits those messages to another host computing device (e.g., to another user via an application server implementing an application service).

As previously noted, SOC 115 includes (and provides) provisioned seed 125, PUF 130, and RNG 135. In one embodiment, provisioned seed 125 is a factory provisioned secret. For example, a provider of SOC 115 (e.g. a production chip) provides an Original Equipment Manufacturer (OEM) with SOC 115. The OEM generates one or more security keys (also called authentication keys). These security keys enable storage and retrieval of encrypted data on non-volatile memory included in the production chip (e.g., memory 120 that is not directly accessible by a user of input device 105). The OEM then encrypts an OEM-developed software application (e.g., an OS for input device 105) and any additional OEM-specific chip configuration data via the security keys and generates a provisioning image (e.g., provisioned seed 125). Subsequently, the OEM transfers the production chip (e.g., SOC 115), the security keys, and the provisioning image (e.g., provisioned seed 125) to a manufacturing factory. The manufacturing factory applies the provisioning image to the production chips. Provisioned seed 125 configures memory 120 in SOC 115 to gate execution of a software application based on authentication of the security keys. The manufacturing factory delivers the configured production chip (e.g., SOC 115 with provisioned seed 125) to be implemented in input device 105. (e.g., a keyboard SOC).

RNG 135 (e.g., a hardware/true RNG) is a device that is integrated with SOC 115 and generates random numbers from a physical process. In some embodiments, RNG 135 is based on microscopic factors that generate low-level, statistically random "noise" signals such as thermal noise, the photoelectric effect, and other quantum phenomena, and includes a transducer to convert physical factors to an electrical signal, an amplifier to increase the amplitude of the random fluctuations to a measurable level, and an analog to digital converter to convert output to a digital number (e.g., a binary digit such as 0 or 1). By sampling randomly varying signals, RNG 135 generates a series of random numbers and facilitates cryptographic operations by generating random cryptographic keys to transmit data securely.

PUF 130 is a "digital footprint" that services as a unique identity for SOC 115 and input device 105 and is a physical entity that is embodied in SOC 115 (e.g., in a physical structure such as an integrated circuit). PUF 130 is based on physical variations that occur during the manufacturing of SOC 115, which makes it possible to differentiate between otherwise identical SOCs. Therefore, PUF 130 can be utilized by input device 105 to facilitate cryptographic operations associated with high security requirements because PUF 130 depends on the uniqueness of its physical microstructure. In this example, the physical microstructure of PUF 130 depends on one or more random physical factors introduced during manufacturing PUF 130 which are unpredictable and uncontrollable, thus making it virtually impossible to duplicate or clone PUF 130.

In one embodiment, rather than implementing a single cryptographic key, PUF 130 implements a challenge-response authentication to evaluate a PUF microstructure. When a physical stimuli is applied to the structure of PUF 130, PUF 130 reacts in an unpredictable (but repeatable) manner due to the complex interaction of the stimulus with the physical microstructure of PUF 130. In this example, the applied stimulus is called the challenge, and the reaction of PUF 130 is called the response. A specific challenge and its corresponding response together form a challenge-response pair (CRP). PUF 130's identity is established by the properties of the microstructure of PUF 130. Because this microstructure is not revealed by the challenge-response mechanism, PUF 130 is resistant to spoofing attacks.

In another embodiment, PUF 130 is a fuzzy extractor or a key extractor and can be used to extract a unique strong cryptographic key from its physical microstructure. The same unique key is reconstructed each time PUF 130 is evaluated. The challenge-response mechanism is then implemented using cryptography. PUF 130 provides both physical (a unique and unpredictable way of mapping challenges to responses) and mathematical unclonability (resistance to compute an unknown response given the other CRPs or some of the properties of the random components from PUF 130). Given at least the foregoing properties, PUF 130 is implemented by input device 105 as a unique and untamperable device identifier, and is used by input device 105 and SOC 115 for secure key generation, storage, and a source of randomness.

In certain embodiments, PUF 130 use explicitly introduced randomness or intrinsic randomness. In these examples, PUF 130 can be an optical PUF, a coating PUF, a delay PUF, a Dynamic Random Access Memory (DRAM) PUF, Static Random Access Memory (SRAM) PUF, a butterfly PUF, a bistable ring PUF, a digital PUF, a magnetic PUF, a metal-based PUF, a quantum confinement PUF, a VIA PUF, or a photonic PUF.

In certain embodiments, input device 105 is a USB device for host computing device 145 and provides a secure hardware-based keyboard provisioned with a secret in a factory (e.g., provisioned seed 125), determines a unique key for input device 105 (e.g., PUF 130), generates random or pseudorandom numbers (e.g., using RNG 135), and includes secure storage (e.g., memory 120), a keypad (e.g., user input 140), and a non-GUI display (e.g., user interface 110). Input device 105 provides an additional layer of protection on top of existing applications (e.g., application 150).

In some embodiments, provisioned seed 125, PUF 130, or RNG 135 generate high entropy asymmetric keys, and memory 120 stores these asymmetric keys. A processor of SOC 115 is used to control commands associated with memory 120, provisioned seed 125, PUF 130, and RNG 135. In this example, input device 105 is a keyboard SOC and is communicatively coupled to host computing device via USB. Host computing device 145 includes a driver layer for input device 105 and an application plugin that permits commands from host computing device 145 to be displayed on user interface 110 (e.g., a non-GUI LCD display).

In other embodiments, data typed by a user of input device 105 is displayed on user interface 110 that is attached to or integrated with input device 105. In this manner, the keyboard SOC permits the user to receive a preview of a message that is typed into user input 140 (e.g., for editing purposes), before the message is encrypted (e.g., first by SOC 115). In some examples, although the use of application 150 executing on host computing device 145 is necessary for message delivery (e.g., by message manager 155), host computing device 145 does not receive and is not privy to the message typed on the keyboard SOC (e.g., while protection mode is activated) by the user of input device 105.

Example Keyboard System on a Chip

Figure 2:
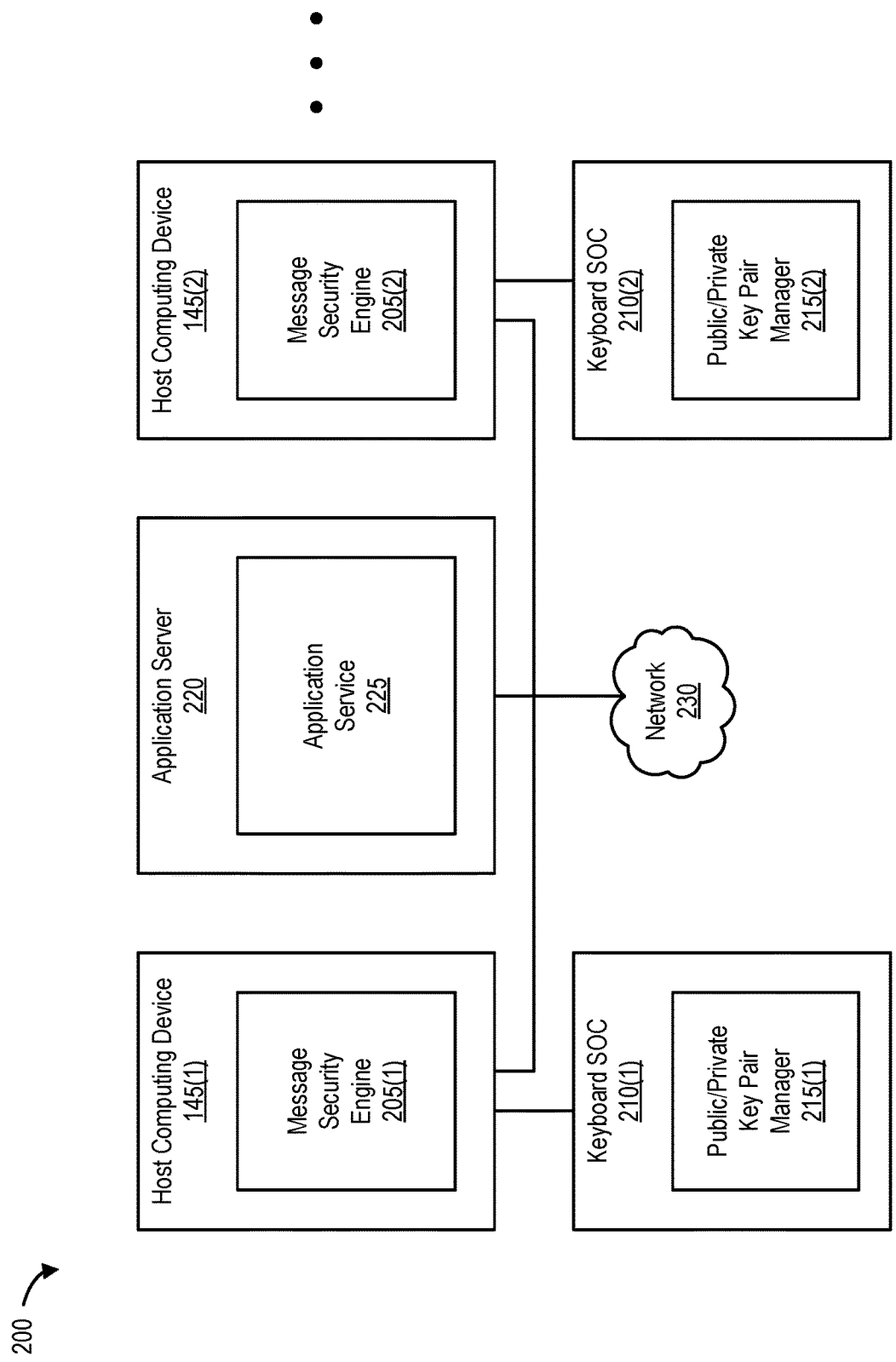
FIG. 2 is a block diagram 200 of a keyboard system on a chip (SOC) implemented in a layered encryption computing system, according to one embodiment of the present disclosure.

FIG. 2 is a block diagram 200 of a keyboard system on a chip (SOC) implemented in a layered encryption computing system, according to one embodiment. As shown in FIG. 2, host computing devices 145(1) and 145(2), each implement a message security engine 205(1) and 205(2) respectively. Message security engines 205(1) and 205(2) can be implemented by a message manager and provide for the second round of encryption (and associated decryption) of messages first encrypted by a keyboard SOC. Keyboard SOCs 210(1) and 210(2) (e.g., input devices with a SOC as shown in FIG. 1), each implement a public/private key pair manager 215(1) and 215(2), respectively. Public/private key pair managers 215(1) and 215(2) generate public/private key pairs for host computing devices 145(1) and 145(2), respectively, using one or more cryptographic methodologies, specifications, and/or mechanisms (e.g., Rivest-Shamir-Adleman (RSA), Diffie-Hellman, Cramer-Shoup cryptosystem, ElGamal encryption, elliptic-curve cryptography (ECC), and the like).

Application server 220 implements an application service 225 that provides messaging application services to host computing devices 145(1) and 145(2) communicatively coupled to keyboard SOCs 210(1) and 210(2) (e.g., via USB, among other means), respectively. Host computing devices 145(1) and 145(2) and application server 220 are communicatively coupled to each other via network 230. Network 230 can be any type of network include the Internet, a Wide Area Network (WAN), a Local Area Network (LAN), a Storage Area Network (SAN), or any other type of interconnection.

In one embodiment, keyboard SOC 210(1) displays user input 140 in user interface 110 on input device 105. Public/private key pair manager 215(1) determines a public/private key pair based on a random number generated by RNG 135, provisioned seed 125, or PUF 130 provided by input device 105 (e.g., on SOC 115). Public/private key pair manager 215(1) stores a previous public/private key pair in a storage device associated with input device 105 (e.g., memory 120) using a recipient public key as an index (e.g., public key of host computing device 145(2)), encrypts user input 140 with the recipient public key, and sends the derived public key as a header followed by the encrypted user input to host computing device 145(2).

In certain embodiments, the encrypted user input (e.g., user input 140) is a message, message security engine 205(1)) executing on host computing device 145(1) encrypts the encrypted user input, the twice-encrypted user input is received by host computing device 145(2) (e.g., via application server 220) that decrypts the encryption performed by message security engine 205(1)), and sends the encrypted user input to keyboard SOC 210(2). Keyboard SOC 210(2) stores the header of the derived public key for encrypting the next message, decrypts the encrypted user input using a private key, and displays the user input in a user interface (e.g., a non-GUI LCD display) of keyboard SOC 210(2).

In some embodiments, public/private key pair manager 215(1) generates a new public/private key pair after each message is sent from keyboard SOC 210(1) to host computing device 145(2) (e.g., a high entropy asymmetric key pair for each message). In other embodiments, public/private key pair manager 215(1) generates public/private key pairs based on physical characteristics of keyboard SOC 210(1) indicated by PUF 130, stores previous public/private key pairs in memory 120, determines whether messages are synchronized based on the previous public/private key pairs, receives a recipient address from host computing device 145(2), and indexes the recipient address in memory 120 (e.g., to enable multi-user concurrent messaging). The second layer of encryption for messages permits key pairs to be new in each session and because key pairs are archived, users can be alerted of dropped messages while communication between users is ongoing.

Example of Performing Layered Encryption

Figure 3A:
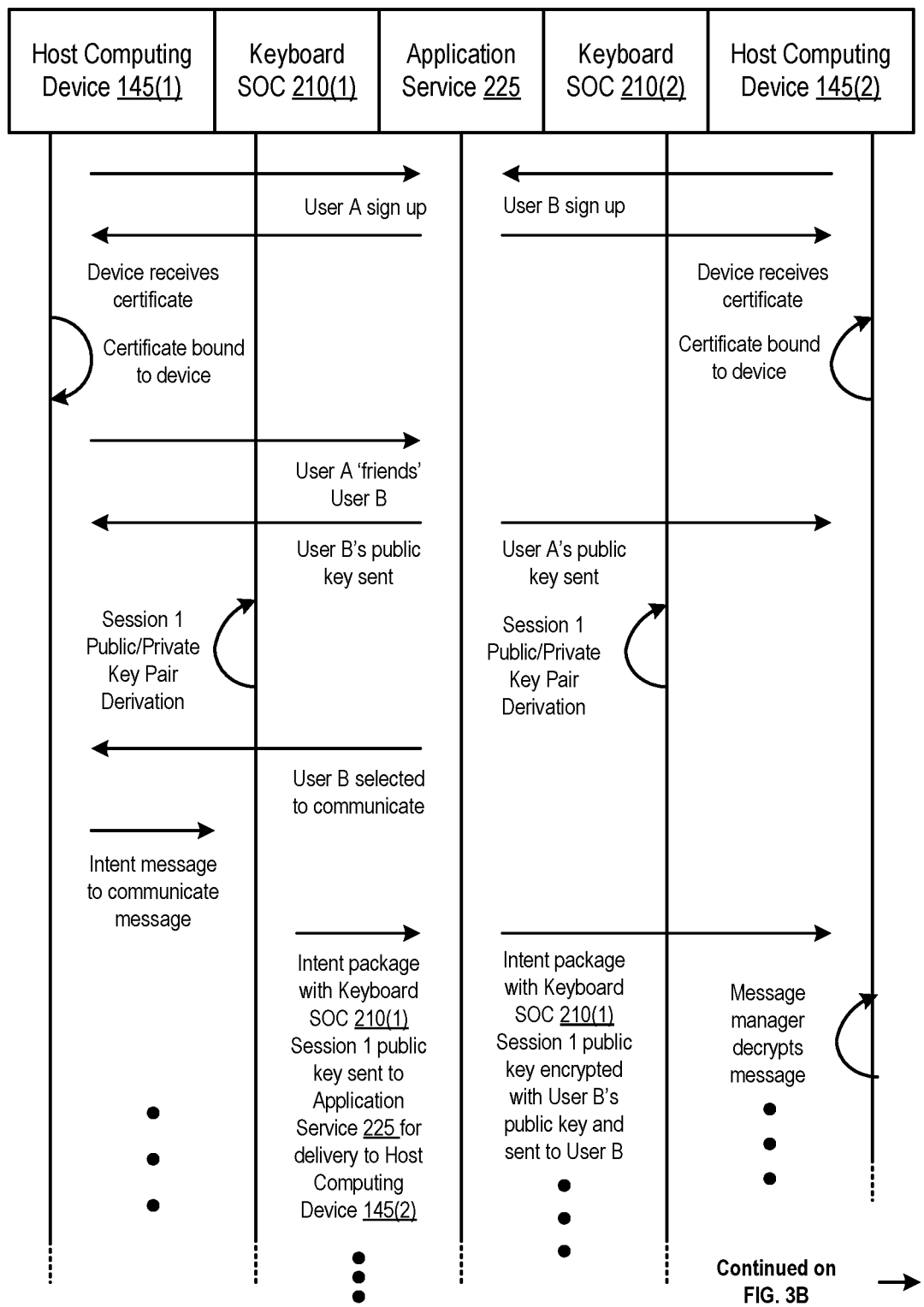
FIG. 3A a table 300A that illustrates layered encryption operations performed by keyboard SOCs, according to one embodiment of the present disclosure.

FIG. 3A a table 300A that illustrates layered encryption operations performed by keyboard SOCs, according to one embodiment. As shown in FIG. 3A, user A of host computing device 145(1) and user B of host computing device 145(2) both sign up with application service 225 (e.g., register as authorized users). Host computing devices 145(1) and 145(2) both receive a certificate from application service 225 (e.g., security certificates) and the certificates are bound to host computing devices 145(1) and 145(2). User A then 'friends' user B indicating that user A and user B are ready to communicate with each other. Application service 225 then sends user B's public key to host computing device 145(1) and user A's public key to host computing device 145(2).

Next, keyboard SOCs 210(1) and 210(2) both derive a session 1 public/private key pair. Application service 225 informs user A that user B has been selected to communicate. Host computing device 145(1) sends an intent message to communicate message to keyboard SOC 210(1). An intent package with keyboard SOC 210(1) session 1 public key is sent to application service 225 for delivery to host computing device 145(2). The intent package with keyboard SOC 210(1) session 1 public key is encrypted with user B's public key and sent to user B. Message manager on host computing device 145(2) decrypts the message.

Figure 3B:
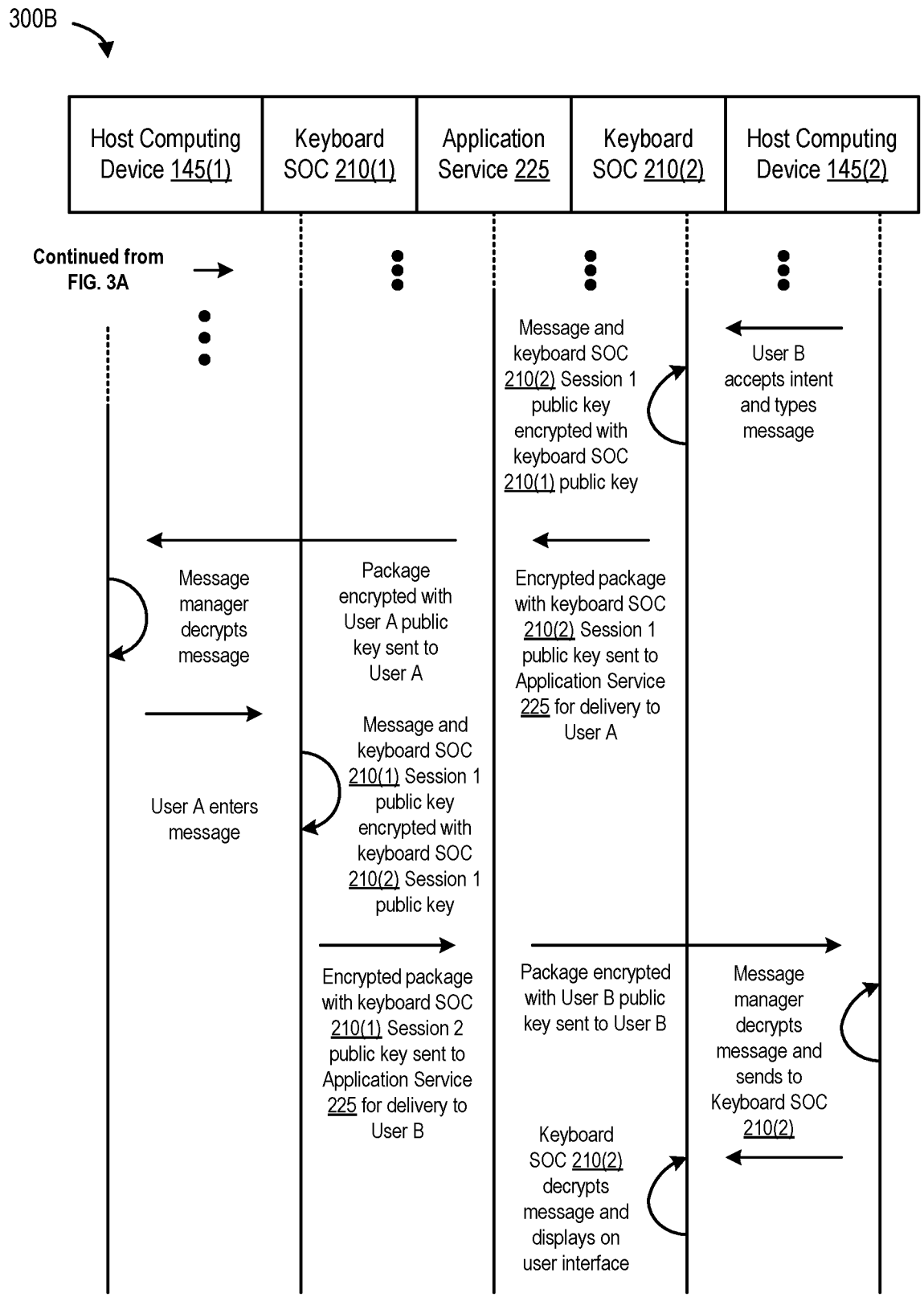
FIG. 3B is a table 300B that illustrates layered encryption operations performed by keyboard SOCs, according to one embodiment of the present disclosure.

FIG. 3B is a table 300B that illustrates layered encryption operations performed by keyboard SOCs, according to one embodiment. User B accepts intent and types a message. Keyboard SOC 210(2) encrypts the message and keyboard SOC 210(2) session 1 public key with keyboard SOC 210(1) public key. The encrypted package with keyboard SOC 210(2) session 1 public key is sent to application service 225 for delivery to user A. The package encrypted with user A public key is sent to user A by application service 225. Message manager on host computing device 145(1) decrypts the message.

Next, user A enters a message. Keyboard SOC 210(1) encrypts the message and keyboard SOC 210(1) public key with keyboard SOC 210(2) session 1 public key. An encrypted package with keyboard SOC 210(1) session 2 public key is sent to application service 225 for delivery to user B. The package encrypted with user B's public key is sent to user B by application service 225 (e.g., to host computing device 145(2)). Message manager on host computing device 145(2) decrypts the message and sends the message to keyboard SOC 210(2). Keyboard SOC 210(2) then decrypts the message and displays the message on a user interface of keyboard SOC 210(2) (e.g., a non-GUI LCD display).

In this manner, providing at least one extra layer of encryption allows public/private key pairs in each session to be new and an archive of previous public/private key pairs permits a user to be alerted of dropped message, while at the time permitting the continuation of communications between user A and user B. Because a non-GUI display is implemented, asymmetric key pairs can be implemented without the need for symmetric exchange due to the low performance demand of text-based messaging.

It should be noted that certain solutions provide an installable OS application that can route keystrokes to a custom keyboard driver or a user authorized cryptographic key (without being directly connected to a keyboard's KSO/KSI lines). However, the methods and systems described with references with FIGS. 1, 2, 3A, and 3B permit the encryption of data before the data leaves a keyboard (e.g., before the data makes contact with an output cable or interface connected from a keyboard to a host computer), and provide machine derived cryptographic keys in both pre-boot and post-boot computing environments.

Processes for Layered Encryption for End to End Communication

Figure 4:
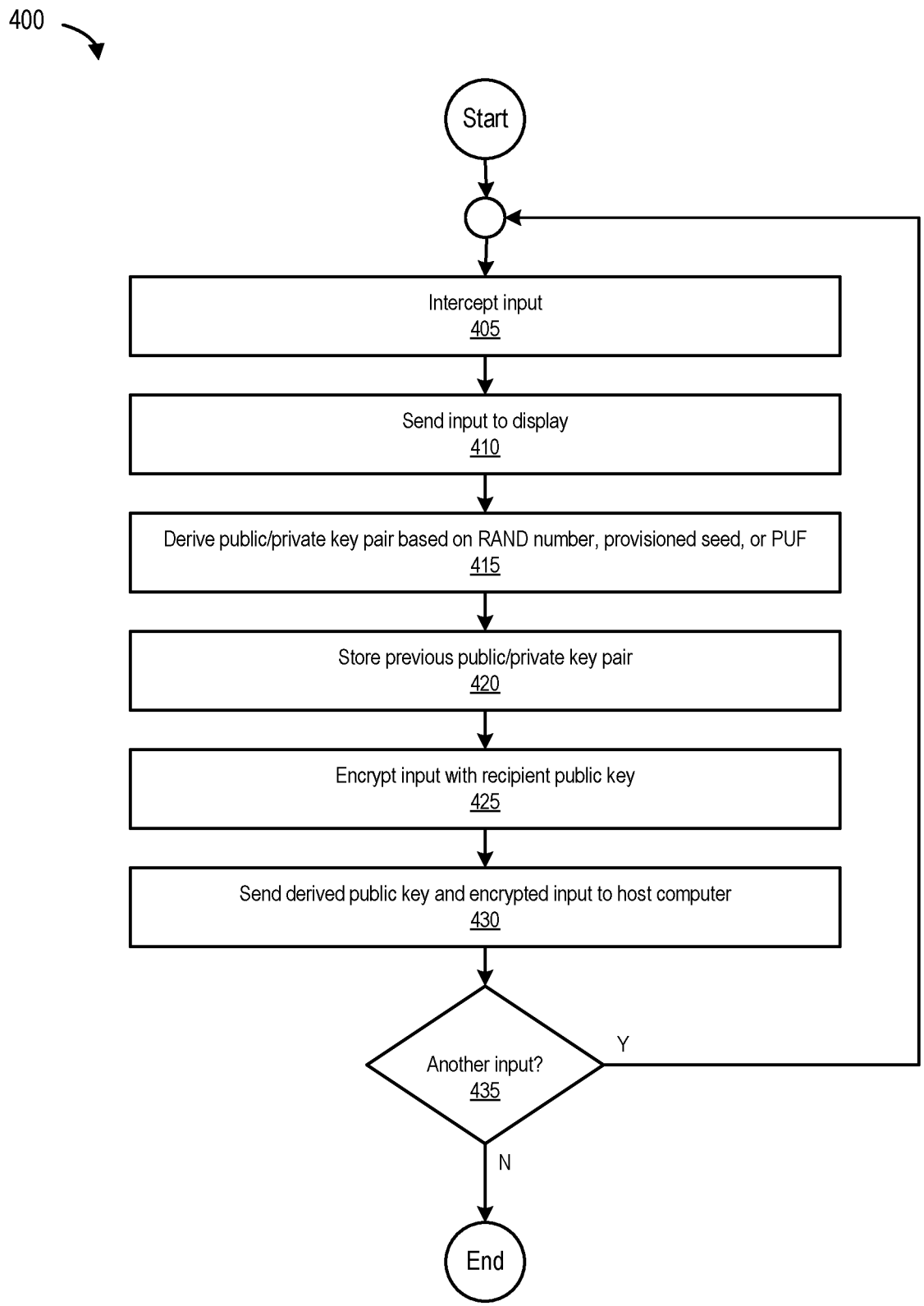
FIG. 4 is a flowchart 400 of a process for providing layered encryption for end to end communication, according to one embodiment of the present disclosure.

FIG. 4 is a flowchart 400 of a process for providing layered encryption for end to end communication, according to one embodiment. The process begins at 405 by intercepting an input (e.g., user input 140 before the input leaves input device 105). Such interception can be performed by SOC 115. At 410, the process sends the input to a display (e.g., user interface 110, a non-GUI display, a LCD display, and the like), and at 415, derives a public/private key pair (e.g., using public/private key pair manager 215(1)) based on a random number (e.g., using RNG 135), a provisioned seed (e.g., provisioned seed 125) or a PUF (e.g., PUF 130). In one embodiment, PUF 130 uses at least one physical characteristic of SOC 115 (e.g., operating temperature, and the like) to derive the public/private key pair.

At 420, the process stores previous public/private key pairs (e.g., in memory 120 of SOC 115 for permitting determination of whether one or more messages have been dropped and allowing a user to scroll through previous private keys using user interface 110 to find the missing message(s)—memory 120 can be configured to store a pre-determined number of public/private key pairs for use if messages are out of synchronization). At 425, the process encrypts the input with a recipient's public key (e.g., received from an application server), and at 430, sends the derived public key (e.g., derived in step 415) and the encrypted input (e.g., the first layer of encryption) to the host computer (e.g., host computer 145). At 435, the process determines if there is another input. If there is another input, the process loops to 405. Otherwise, the process ends.

Figure 5:
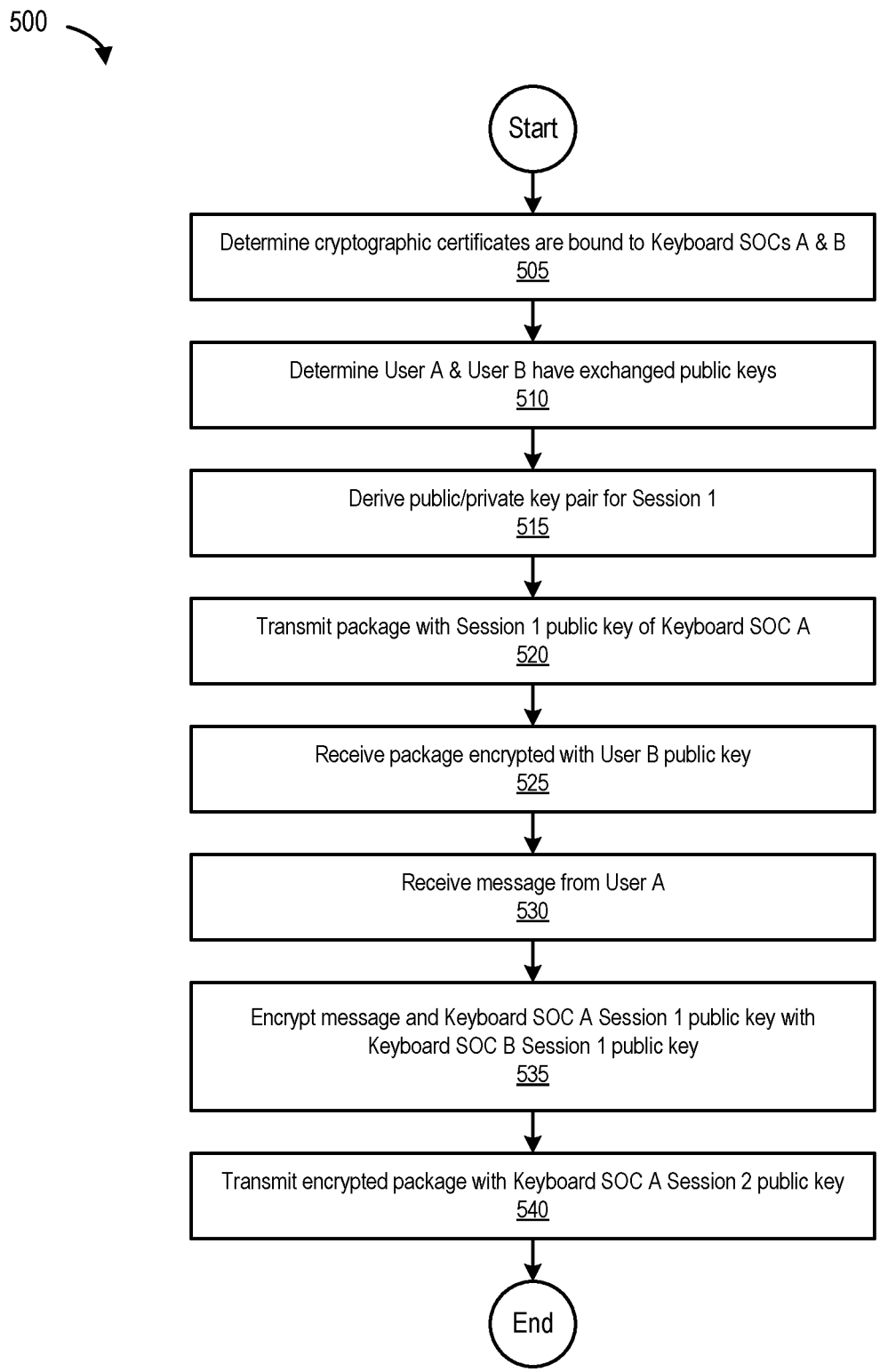
FIG. 5 is a flowchart 500 of a process for performing layered encryption using a keyboard SOC, according to one embodiment of the present disclosure.

FIG. 5 is a flowchart 500 of a process for performing layered encryption using a keyboard SOC, according to one embodiment. The process begins at 505 by determining that cryptographic certificates are bound to keyboard SOCs A and B (e.g., keyboard SOCs 210(1) and 210(2)). At 510, the process determines that user A and user B have exchanged pubic keys (e.g., via application service 225). At 515, the process derives a public private key pair for session 1 (e.g., public/private key pair manager 215(1) implemented on keyboard SOC 210(1)), and at 520, transmits a package with session 1 public key of keyboard SOC A (e.g., from keyboard SOC 210(1) to host computing device 145(1)).

At 525, the process receives a package encrypted with user B's public key, and at 530, receives a message from user A. At 535, the process encrypts the message and keyboard SOC A (e.g., keyboard SOC 210(1)) session 1 public key with keyboard SOC B (e.g., keyboard SOC 210(2)) session 1 public key. The process ends at 540 by transmitting the encrypted package with keyboard SOC A (e.g., keyboard SOC 210(1)) session 2 public key.

Figure 6:
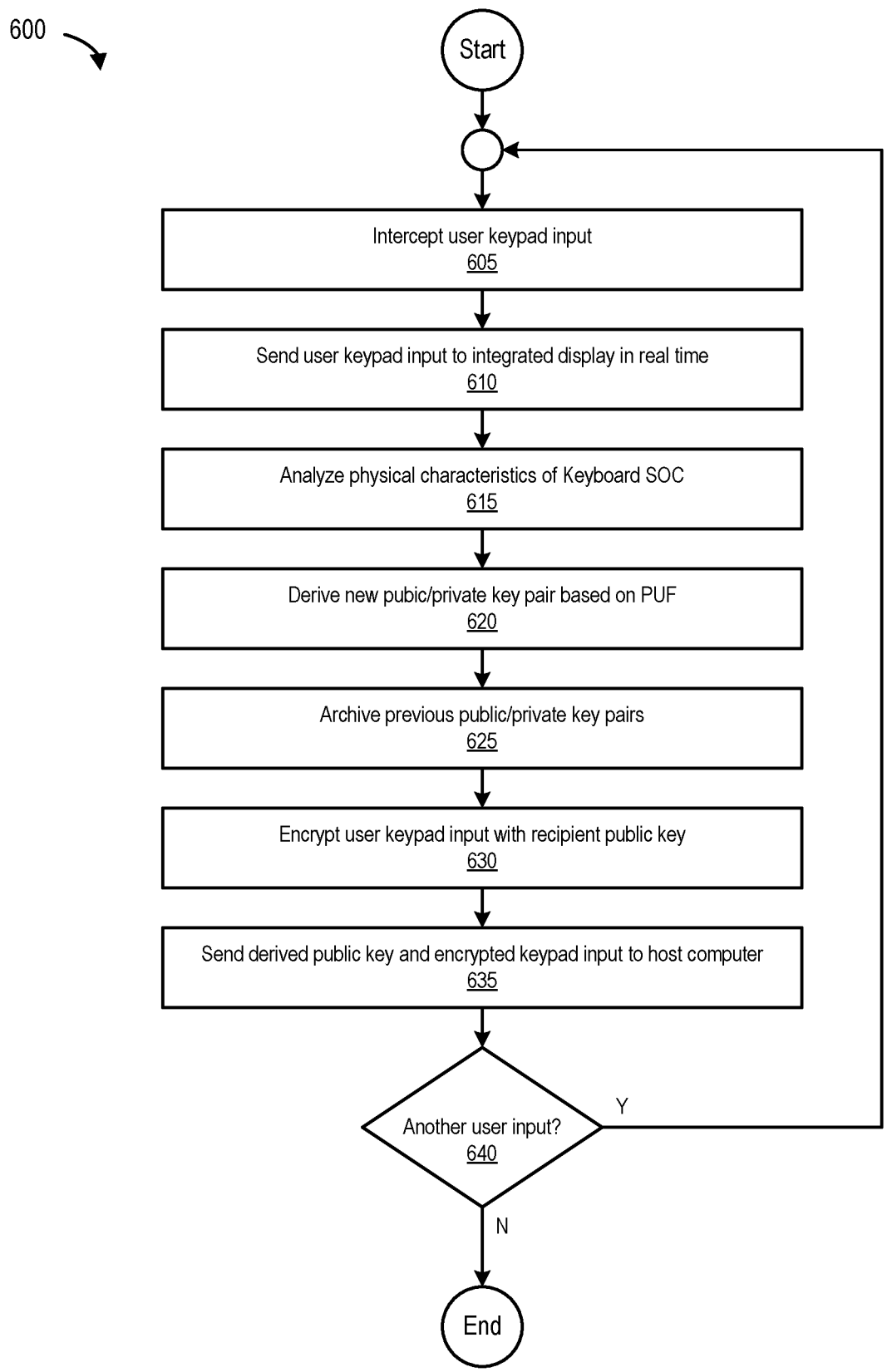
FIG. 6 is a flowchart 600 of a process for performing layered encryption using a physical unclonable function (PUF), according to one embodiment of the present disclosure.

FIG. 6 is a flowchart 600 of a process for performing layered encryption using a physical unclonable function or physically unclonable function (PUF), according to one embodiment. The process begins at 605 by intercepting user keypad input (e.g., user input 140). At 610, the process sends the user keypad input to an integrated display in real time (e.g., to user interface 110). At 615, the process analyzes one or more physical characteristics of the keyboard SOC (e.g., of SOC 115 using PUF 130).

At 620, the process derives (or generates) new public/private key pairs based on the PUF (e.g., PUF 130), and at 625, archives previous public/private key pairs (e.g., in memory 120 implemented in SOC 115 as shown in FIG. 1). At 630, the process encrypts the user keypad input with the recipient's public key (e.g., public key of user B of host computing device 145(2) received from application server 220 or application service 225). At 635, the process sends the derived public key and the encrypted user keypad input to an associated host computer (e.g., to host computing device 145(1), to which keyboard SOC 210(1) is communicatively coupled via USB). At 640, the process determines if there is another user input. If there is another user input, the process loops to 605. Otherwise, the process ends.

Figure 7:
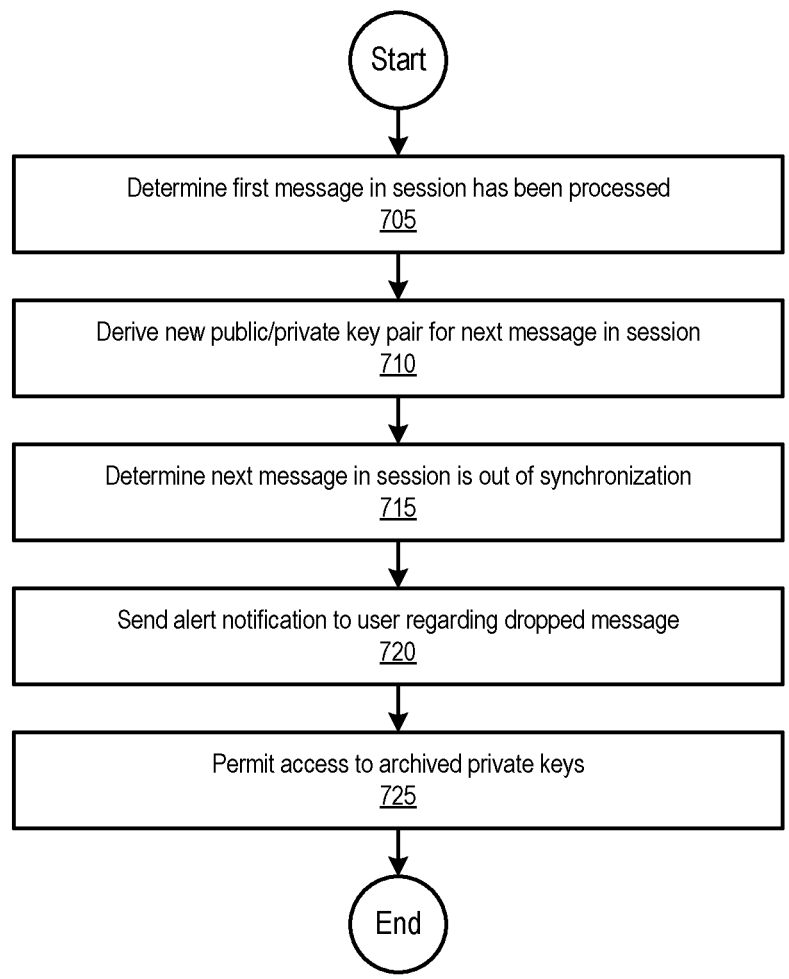
FIG. 7 is a flowchart 700 of a process for processing unsynchronized messages, according to one embodiment of the present disclosure.

FIG. 7 is a flowchart 700 of a process for processing unsynchronized messages, according to one embodiment. The process begins at 705 by determining that a first message in a session has been processed. At 710, the process derives a new public/private key pair for the next message in the session. At 715, the process determines that the next message in the session is out of synchronization, and at 720, sends an alert notification to a user regarding the dropped message. The process ends at 725 by permitting access to archived private keys.

In this manner, the methods, systems, and processes provide layered encryption to facilitate end-to-end communication by preventing unauthorized third parties from intercepting messages intended to be encrypted by messaging applications, securing data content before a native application applies encryption, and/or supporting machine derived cryptographic key encryption in both pre-boot and post-boot computing environments.

Example Computing Environment

Figure 8:
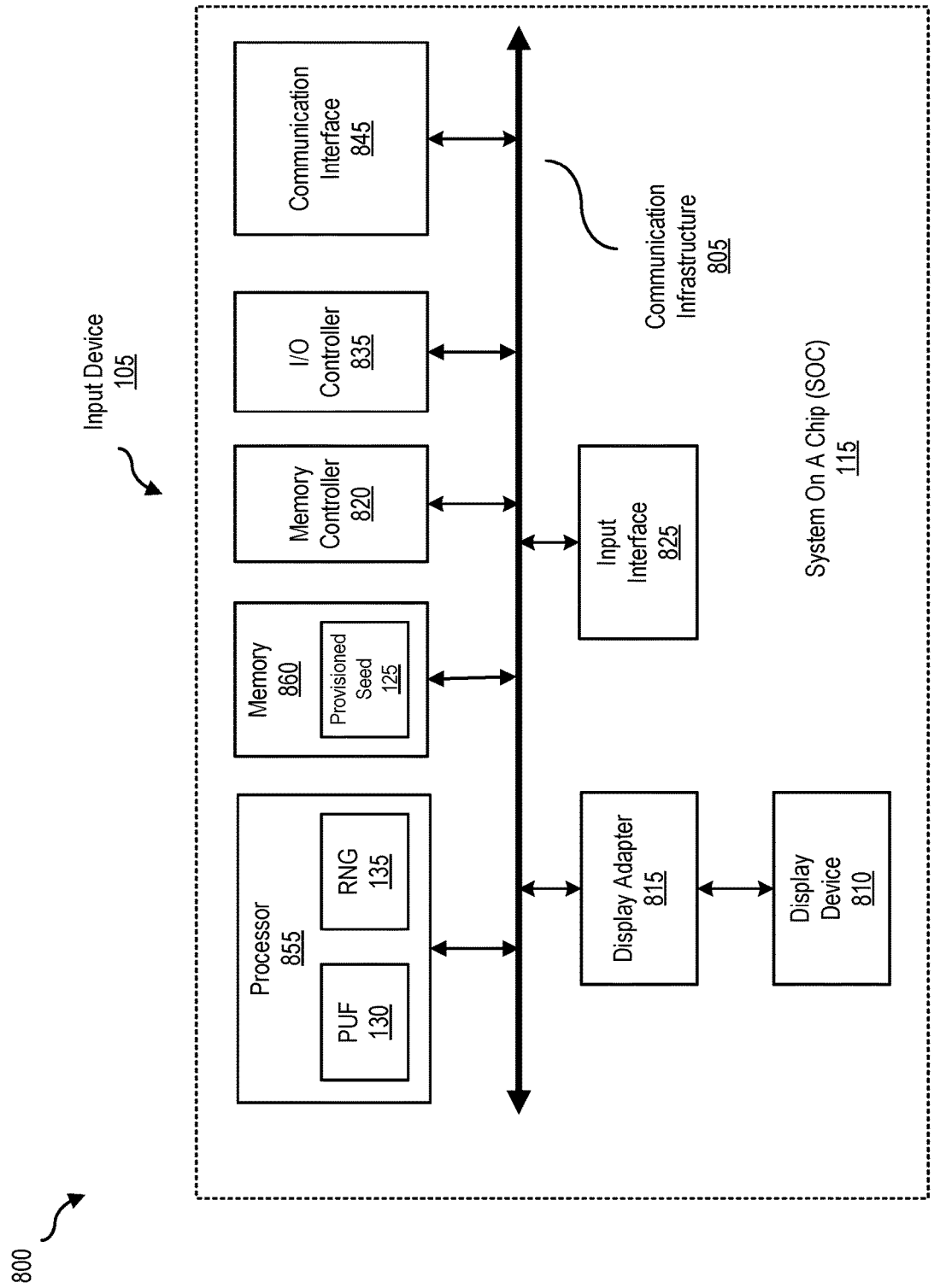
FIG. 8 is a block diagram 800 of layered encryption computing system, according to one embodiment of the present disclosure.

FIG. 8 is a block diagram 800 of input device 105 with SOC 115 (e.g., an information handling device), according to one embodiment. Computing system 800 can include input device 105 and broadly represents any single or multi-processor input device capable of executing computer-readable instructions. In its most basic configuration, computing system 800 may include at least one processor 855 and a memory 860. By executing the software that executes a public/private key pair manager, computing system 800 becomes a special purpose input device that is configured to provide layered encryption to facilitate end to end communication.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, and input interface 825.

Communication interface 845 broadly represents any type or form of communication device or adapter capable of facilitating communication between computing system 800 and one or more other devices. Communication interface 845 may facilitate communication between computing system 800 and one or more host computing systems. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Input device 105 generally represents any type or form of input device capable of providing input, either computer or human generated, to computing system 800. Examples of input device 105 include a keyboard, a keypad, a haptic input interface, a pointing device, a speech recognition device, or any other input device.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program on a computer-readable storage medium. When executed by processor 855, a computer program loaded into computing system 800 may cause processor 855 to perform and/or be a means for performing the functions of one or more of the embodiments described/illustrated herein.

Example Networking Environment

Figure 9:
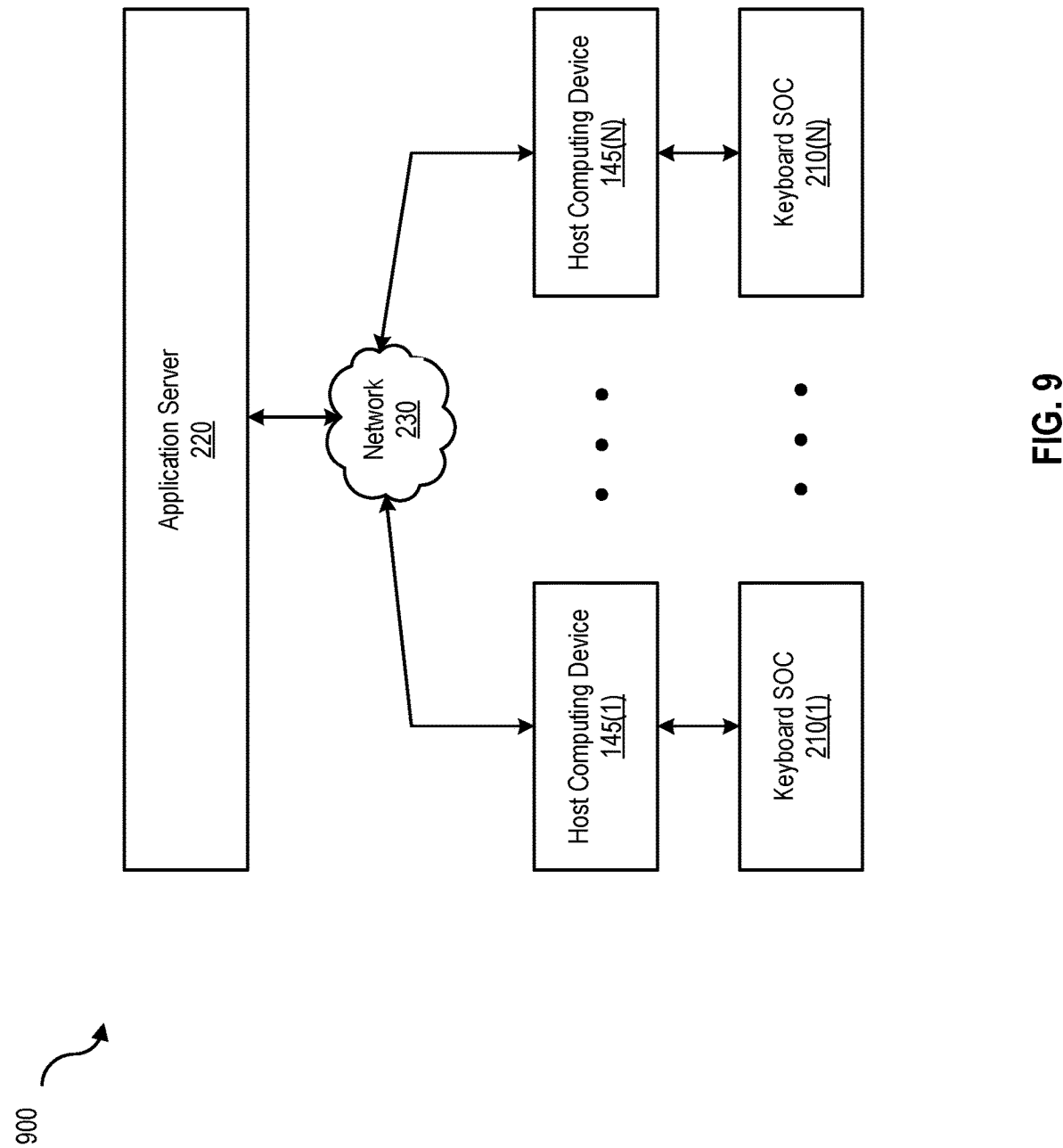
FIG. 9 is a block diagram 900 of a networked system, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with application server 220 and host computing devices 145(1)-(N) using Network File System (NFS), Server Message Block (SMB), or Common Internet File System (CIFS). Network 230 generally represents any type or form of computer network or architecture capable of facilitating communication between application server 220 and host computing devices 145(1)-(N).

In one embodiment, all or a portion of one or more of the disclosed embodiments may be encoded as a computer program and loaded onto and executed by keyboard SOCs 210(1)-(N). All or a portion of one or more of the embodiments disclosed herein may also be encoded as a computer program, stored on application server 220, keyboard SOCs 210(1)-(N) and/or host computing devices 145(1)-(N), and distributed over network 230.

In some examples, all or a portion of application server 220 and host computing devices 145(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   receiving, at a sender host computing device, a public key of a first asymmetric public/private key pair from a recipient host computing device, wherein the first asymmetric public/private key pair is derived for a messaging application executed at the recipient host computing device;
   receiving, at the sender host computing device, a public key of a second asymmetric public/private key pair derived by a first user input device of the recipient host computing device;
   communicating the public key of the second asymmetric public/private key pair from the sender host computing device to a second user input device, wherein the second user input device is an input device of the sender host computing device,
wherein
the second user input device is configured to intercept user input intended or the sender host computing device, and to encrypt the intercepted user input using the public key of the second asymmetric public/private key pair derived by the first user input device,
the second user input device includes at least one semiconductor integrated circuit,
the second user input device provides a visual display of a user input in a user interface, wherein the displayed user input is derived from unencrypted user input,
the second user input device derives a third asymmetric public/private key pair based at least on one of a random number, a provisioned seed, or an output value of a physical unclonable function (PUF),
wherein the at least one of the random number, provisioned seed, and output value of the PUF used to derive the third asymmetric public/private key pair is derived from generally random characteristics exhibited by the at least one semiconductor integrated circuit;
providing encrypted user input from the second user input device to the sender host computing device, wherein the user input is encrypted using the public key of the third asymmetric public/private key pair;
storing a previously derived third asymmetric public/private key pair in a storage device associated with the second user input device, wherein the previously derived third asymmetric public/private key pair is stored using the public key of the second asymmetric public/private key pair as an index of the previously derived third asymmetric public/private key pair, wherein the previously derived third asymmetric public/private key pair was derived during a prior communication session between the sender host computing device and the recipient host computing device;
deriving a fourth asymmetric public/private key pair using the sender host computing device, wherein the fourth asymmetric public/private key pair is derived for a messaging application executed at the sender host computing device;
encrypting, by the sender host computing device, the encrypted user input using the public key of the first asymmetric public/private key pair to generate an encrypted message; and
sending the encrypted message and the public key of the third asymmetric public/private key pair to the recipient host computing device.

2. The method of claim 1, wherein
receiving the encrypted message, public key of the third public/private key pair, and the public key of the fourth asymmetric public/private key pair at the recipient host computing device;
decrypting the encrypted message at the recipient host computing device using the public key of the third public/private key pair to retrieve the encrypted user input;
decrypting, at the first user input device, the encrypted user input using the public key of the asymmetric third public/private key pair; and
displaying the user input of the decrypted user input on the first user input device.

3. The method of claim 2, wherein
the second user input device derives a new third asymmetric public/private key pair each time the second user input device sends an encrypted user input to the sender host computing device.

4. The method of claim 1, wherein
the second user input device is a keyboard system on a chip (SOC),
the keyboard SOC comprises a keypad to receive the user input,
the storage device is part of the keyboard SOC,
the user interface is a non-graphical user interface, and
the keyboard SOC is communicatively coupled to the sender host computing device through a Universal Serial Bus (USB).

5. The method of claim 4, wherein
the second user input device derives one or more public/private key pairs based on one or more physical characteristics of the keyboard SOC indicated by the PUF.

6. The method of claim 1, further comprising:
storing a plurality of previously derived third asymmetric public/private key pairs in the storage device of the second user input device; and
determining whether one or more messages decrypted at the second user input device are not synchronized based on the plurality of previously derived third asymmetric public/private key pairs.

7. A non-transitory computer readable storage medium comprising program instructions executable to implement a method, the method comprising:
receiving, at a sender host computing device, a public key of a first asymmetric public/private key pair from a recipient host computing device, wherein the first asymmetric public/private key pair is derived for a messaging application executed at the recipient host computing device;
receiving, at the sender host computing device, a public key of a second asymmetric public/private key pair derived by a first user input device of the recipient host computing device;
communicating the public key of the second asymmetric public/private key pair from the sender host computing device to a second user input device, wherein the second user input device is an input device of the sender host computing device,
wherein
the second user input device is configured to intercept user input intended for the sender host computing device, and to encrypt the intercepted user input using a public key of a third asymmetric public/private key pair derived by the second user input device,
the second user input device includes at least one semiconductor integrated circuit;
the second user input device displays a user input to a user in a user interface, wherein the displayed user input is derived from unencrypted user input,
the second user input device derives a third asymmetric public/private key pair based at least on one of a random number, a provisioned seed, or an output value of a physical unclonable function (PUF),
wherein the at least one of the random number, provisioned seed, and output value of the PUF used to derive the third asymmetric public/private key pair is derived from generally random characteristics exhibited by the at least one semiconductor integrated circuit;

providing encrypted user input from the second user input device to the sender host computing device, wherein the user input is encrypted using the public key of the third asymmetric public/private key pair;

storing a previously derived third asymmetric public/private key pair in a storage device associated with the second user input device, wherein the previously derived third asymmetric public/private key pair is stored using the public key of the second asymmetric public/private key pair as a n index of the previously derived third asymmetric public/private key pair, wherein the previously derived third asymmetric public/private key pair was derived during a prior communication session between the sender host computing device and the recipient host computing device;

deriving a fourth asymmetric public/private key pair using the sender host computing device, wherein the fourth asymmetric public/private key pair is derived for a messaging application executed at the sender host computing device;

encrypting, by the sender host computing device, the encrypted user input using the public key of the first asymmetric public/private key pair to generate a n encrypted message; and sending the encrypted message and the public key of the third asymmetric public/private key pair to the recipient host computing device.

8. The non-transitory computer readable storage medium of claim 7, wherein receiving the encrypted message and public key of the third public/private key pair at the recipient host computing device;

decrypting the encrypted message at the recipient host computing device using the public key of the third public/private key pair to retrieve the encrypted user input;

decrypting, at the first user input device, the encrypted user input using the public key of the asymmetric third public/private key pair; and displaying the user input of the decrypted user input on the first user input device.

9. The non-transitory computer readable storage medium of claim 7, the method further comprising:

the second user input device derives a new third asymmetric public/private key pair each time the second user input device sends an encrypted user input to the sender host computing device.

10. The non-transitory computer readable storage medium of claim 7, wherein the second user input device is a keyboard system on a chip (SOC), the keyboard SOC comprises a keypad to receive the user input, the storage device is part of the keyboard SOC, the user interface is a non-graphical user interface, and the keyboard SOC is configured to be communicatively coupled to the sender host computing device through a Universal Serial Bus (USB).

11. The non-transitory computer readable storage medium of claim 10, the method further comprising:

generating one or more third asymmetric public/private key pairs based on one or more physical characteristics of the keyboard SOC indicated by the PUF.

12. The non-transitory computer readable storage medium of claim 7, the method further comprising:

storing a plurality of previously derived third asymmetric public/private key pairs in the storage device; and determining whether one or more messages decrypted at the second user input device are not synchronized based on the plurality of previously derived third asymmetric public/private key pairs.

13. A system comprising:

one or more information handling systems, wherein the one or more information handling systems include:

a processor;

a data bus coupled to the processor; and a non-transitory, computer-readable storage medium embodying computer program code, the non-transitory, computer-readable storage medium being coupled to the data bus;

wherein the computer program code included in one or more of the information handling systems is executable by the processor of the information handling system so that the information handling system, alone or in combination with other information handling systems, executes operations comprising:

receiving, at a sender host computing device, a public key of a first asymmetric public/private key pair from a recipient host computing device, wherein the first asymmetric public/private key pair is derived for a messaging application executed at the recipient host computing device;

receiving, at the sender host computing device, a public key of a second asymmetric public/private key pair derived by a first user input device of the recipient host computing device;

communicating the public key of the second asymmetric public/private key pair from the sender host computing device to a second user input device, wherein the second user input device is an input device of the sender host computing device, wherein the second user input device is configured to intercept user input intended for the sender host computing device, and to encrypt the intercepted user input using a public key of a third asymmetric public/private key pair derived by the second user input device, the second user input device includes at least one semiconductor integrated circuit;

displaying, by the second user input device, a user input in a user interface, wherein the displayed user input is derived from an encrypted user input;

deriving, by the second input device, a third asymmetric public/private key pair based on at least one of a random number, a provisioned seed, or an output value of a physical unclonable function (PUF), wherein the at least one of the random number, provisioned seed, and output value of the PUF used to derive the third asymmetric public/private key pair is derived from generally random characteristics exhibited by the at least one semiconductor integrated circuit;

providing encrypted user input from the second user input device to the sender host computing device, wherein the user input is encrypted using the public key of the third asymmetric public/private key pair;

storing, by the second user input device, a previously derived third asynchronous public/private key pair in a storage device associated with the second user input device, wherein the previously derived third asynchronous public/private key pair is stored using the public key of the second asymmetric public/private key pair as an index of the previously derived third asymmetric public/private key pair, wherein the previously derived third asymmetric public/private key pair was derived during a prior communication session between the sender host computing device and the recipient host computing device;

deriving a fourth asymmetric public/private key pair using the sender host computing device, wherein the fourth asymmetric public/private key pair is derived for a messaging application executed at the sender host computing device;

encrypting, by the sender host computing device, the encrypted user input using the public key of the fourth asymmetric public/private key pair to generate a n encrypted message; and sending the encrypted message and public key of the third asymmetric public/private key pair to the recipient host computing device.

14. The system of claim 13, wherein the program code is further operable to execute operations including:

receiving the encrypted message and public key of the third public/private key pair at the recipient host computing device;

decrypting the encrypted message at the recipient host computing device using the public key of the third public/private key pair to retrieve the encrypted user input;

decrypting, at the first user input device, the encrypted user input using the public key of the asymmetric third public/private key pair; and displaying the user input of the decrypted user input on the first user input device.

15. The system of claim 14, wherein the computer program code is further operable to:

derive a new third asynchronous public/private key pair each time the second user input device sends the public key of the third asynchronous public/private key pair and encrypted user input to the sender host computing device.

16. The system of claim 13, wherein the second user input device is a keyboard system on a chip (SOC), the keyboard SOC comprises a keypad to receive the user input, the storage device is part of the keyboard SOC, the user interface is a non-graphical user interface, and the keyboard SOC is communicatively coupled to the host computing device through Universal Serial Bus (USB).

17. The system of claim 16, wherein the computer program code further executes operations including generating one or more public/private key pairs based on one or more physical characteristics of the keyboard SOC indicated by the PUF.

18. The system of claim 13, wherein the computer program code further executes operations including storing a plurality of previously derived third asymmetric public/private key pairs in the storage device;

determining whether one or more messages decrypted at the second user input device are not synchronized based on the plurality of previous public/private key pairs.

* * * * *